US009516276B2

(12) United States Patent
Kirk et al.

(10) Patent No.: US 9,516,276 B2
(45) Date of Patent: Dec. 6, 2016

(54) METHOD OF MEASURING A PROPERTY OF A TRAJECTORY OF A BALL WITH A MOBILE COMPUTER DEVICE

(71) Applicant: adidas AG, Herzogenaurach (DE)

(72) Inventors: Robert Frank Kirk, Nuremberg (DE); Heather Frances Driscoll, Derbyshire (GB); John Kelley, Sheffield (GB); Lee Hickey, Sheffield (GB)

(73) Assignee: adidas AG, Herzogenaurach (DE)

( * ) Notice: Subject to any disclaimer, the term of this patent is extended or adjusted under 35 U.S.C. 154(b) by 326 days.

(21) Appl. No.: 14/207,409

(22) Filed: Mar. 12, 2014

(65) Prior Publication Data
US 2014/0300745 A1 Oct. 9, 2014

(30) Foreign Application Priority Data

Apr. 3, 2013 (DE) .................. 10 2013 205 861

(51) Int. Cl.
*H04N 7/18* (2006.01)
*G06T 7/20* (2006.01)

(52) U.S. Cl.
CPC ........ *H04N 7/18* (2013.01); *G06T 7/20* (2013.01); *G06T 2207/30224* (2013.01)

(58) Field of Classification Search
CPC ............. G06T 2207/30224; G06T 7/20; G06T 2207/30241; G06T 2207/3022; A63B 2220/806; A63B 24/0003; A63B 2220/30; A63B 2220/40; A63B 2024/0028; A63B 2102/18; A63B 2220/20; A63B 2220/62; A63B 69/3658; A63B 71/0605; H04N 7/18; H04N 7/181; H04N 7/185; G01S 3/7865; G01S 3/7864

(Continued)

(56) References Cited

U.S. PATENT DOCUMENTS 8,705,799 B2 * 4/2014 White ............... A63B 24/0003
348/157
2007/0026975 A1 2/2007 Marty et al.
(Continued)

FOREIGN PATENT DOCUMENTS

WO 2007035878 A2 3/2007

OTHER PUBLICATIONS

Video Physics for iOS, Vernier Software & Technology, https://web.archive.org/web/20121123025736/http://www.vernier.com/products/software/video-physics, Nov. 23, 2012, 9 pages.
(Continued)

*Primary Examiner* — Sherrie Hsia
(74) *Attorney, Agent, or Firm* — Kilpatrick Townsend & Stockton LLP

(57) ABSTRACT

Methods for determining a property of a trajectory of a ball with a mobile computer device are described, which include: (a) capturing a sequence of video frames of the ball with a camera of the mobile computer device; (b) determining a first picture coordinate of the ball in a first video frame of the sequence; (c) determining a second picture coordinate of the ball in a second video frame of the sequence; and (d) computing a property of the trajectory of the ball based on a difference of the first and second picture coordinates, a time difference between the first and second video picture and a reference quantity, which may be determined based on a form and/or dimension of the ball in a picture taken with the camera.

19 Claims, 6 Drawing Sheets

(58) Field of Classification Search
USPC ... 348/158, 157, 49, 50, 135, 142, 169, 172; 473/467; 382/103, 106, 107
IPC ...................................................... H04N 7/18
See application file for complete search history.

(56) References Cited

U.S. PATENT DOCUMENTS

2008/0182685 A1\* 7/2008 Marty ................ A63B 24/0003
                                                                  473/407
2008/0219509 A1 9/2008 White et al.

OTHER PUBLICATIONS

Chakraborty et al., 2D Trajectory-based Position Estimation and Tracking of the Ball in a Basketball Video, Department of Electronics and Communication Engineering, National Institute of Technology, Rourkela, India, http://dspace.nitrkl.ac.in/dspace/bitstream/2080/1569/1/2D_Trajectory-Based.pdf, Dec. 1, 2011, 6 pages.
European Patent Application No. 14158725.3, European Search Report mailed Dec. 2, 2014, 8 pages.
Dailey, D.J., et al., An Algorithm to Estimate Vehicle Speed Using Un-Calibrated Cameras, IEEE, 1999, pp. 441-446.
German Patent Application No. 102013205861.6, Office Action mailed Sep. 13, 2016, 5 pages (No English translation available. A summary of the Office Action is provided in the Transmittal Letter submitted herewith).
Wang et al., "Image and Video Based Remote Target Localization and Tracking on Smartphones", Proc. of SPIE, vol. 8392, 2012, 10 pages.

\* cited by examiner

21 — (a) Capturing a sequence of video frames of the ball with a camera of the mobile computer device;

22 — (b) Determining a first picture coordinate of the ball in a first video frame of the sequence;

23 — (c) Determining a second picture coordinate of the ball in a second video frame of the sequence;

24 — (d) Computing a property of the trajectory of the ball based on a difference between the first and second picture coordinates, a time difference between the first and second video picture and a reference quantity, which is determined based on the form and/or dimension of the ball in a picture taken with the camera.

Fig. 2

METHOD OF MEASURING A PROPERTY OF A TRAJECTORY OF A BALL WITH A MOBILE COMPUTER DEVICE

CROSS-REFERENCE TO RELATED APPLICATION

This application claims the benefit of German Patent Application No. 10 2013 205 861.6, filed Apr. 3, 2013, which is hereby incorporated by reference herein in its entirety.

TECHNICAL FIELD

The present invention relates to a method of measuring a property of a trajectory of a ball with a mobile computer device.

BACKGROUND

Mobile computer devices, e.g., smartphones, tablet computers and mobile media players, share a growing popularity among users in recent years. Especially since the introduction of the "iPhone"® of Apple Inc., Cupertino, USA, the share of smartphones in the total market of mobile telephone has steadily increased. With the "iPad", a tablet computer, a new device class of mobile computer devices was successfully established. In addition, the computing power of mobile media players, e.g., the "iPod", which are able to play audio and video data, is not insignificant.

A smartphone is a mobile telephone which besides telephone functionality provides for additional functionality like calendar, email and an internet browser. Therefore, the type of connection into the mobile telephone network is not restricted to pure speech connections as with conventional mobile telephones. Rather, a additional data connection is also provided for offering the user services like email, internet browser and social media like Twitter® and Facebook®.

A tablet computer is a mobile computer, which often comprises a touch sensitive display, instead of a keyboard, for enabling operation of the device. Compared to laptop computers, a tablet computer is most often lighter and smaller, such that it easier to carry.

A mobile media player is able to play audio and video content. The format of the audio content may be, for example, MP3, ACC or WAV, while the format of video content may be MPEG, AVI or MOV. The functionality of mobile media players may be extended by installing application programs, which are also denoted as "Apps".

The resources of mobile computer devices may be more limited than that of desktop computers or laptops. In particular, the processor performance may be reduced to save battery energy and to provide sufficient battery operating time. For cost reduction purposes, mobile computer devices are usually equipped with less memory than desktop or laptop computers.

Often, mobile computer devices comprise hardware components, which typical mobile telephones do not comprise. For example, mobile computer devices may include a camera which can take photos and video sequences, acceleration sensors and magnetic field sensors, NFC (Near Field Communication), Bluetooth and WLAN.

As with desktop computers, the basic functionality of mobile computer devices, for example, controlling the hardware and resource scheduling, is provided by an operating system. The operating system is often adapted to the hardware to achieve an optimal utilization of the limited hardware resources. Known operating systems are "iOS"® of Apple and "Android"® of Google Inc., Mountain View, Calif., USA.

The functionality of mobile computer devices is usually extendable by downloadable computer programs. Such computer programs are also called "apps" in the context of mobile computer devices and provide, for example, travel guides, weather forecasts or games. Usually, apps are downloaded from a virtual market place on the internet. Examples of such market places are "iTunes"® of Apple and "Goolge Play"® of Google.

The present invention relates to ball games such as soccer, tennis, table tennis or golf. In the hobby or amateur field there is a need for measuring a property of a trajectory of a kicked, batted or thrown ball (e.g., a soccer, tennis or golf ball) in a simple and/or cost effective way. The property of the trajectory of the ball may for example be its speed, its acceleration when kicked, thrown or batted or its flight distance. For example hobby soccer players may want to determine which player has the "hardest" kick, e.g., who can accelerate the ball to the highest speed.

In the hobby and amateur fields, systems are known, e.g., for measuring the speed of a ball using radar. These systems are arranged along the trajectory of a ball and measure the speed based on the radiation reflected by the ball, similar to systems for speed measurements of vehicles in traffic.

In the professional field, for example, during TV transmissions of soccer games, systems are known, which optically determine the position of the players and the ball on a playing field. To this end, several stationary cameras are positioned at a certain distance from each other, such that each camera observes the playing field from a different viewing angle. The video frames captured by the cameras are analyzed by a computer with a complicated and hardware demanding software to determine the position of the players and of the ball. An example of such a professional system is the system "VIS.TRACK" of Cairos AG, Karlsbad, Germany.

The disadvantage of such systems is on the one hand that these systems must be carried to the sports venue in addition to other equipment and must be set up. On the other hand, such systems are expensive.

It is therefore the objective of the present invention to provide for a method which is suited to measure a property of a trajectory of a ball in a simple and cost effective way.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

One aspect of the present invention relates to a method for determining a property of the trajectory of a ball with a mobile computer device, comprising the steps: (a) capturing a sequence of video frames of the ball with a camera of the mobile computer device; (b) determining a first picture coordinate of the ball in a first video frame of the sequence; (c) determining a second picture coordinate of the ball in a second video frame of the sequence; (d) computing a property of the trajectory of the ball based on a difference of the first and second picture coordinates, a time difference between the first and second video picture and a reference quantity, which is determined based on a form and/or dimension of the ball in a picture taken with the camera.

The method may be performed on a mobile computer device as it is described above. Mobile computer devices such as smartphones, tablet computers and mobile media players may be small and mobile and may be taken by their owners almost everywhere. Thus, a mobile computer device is usually available at the sports venue where the measurement of the property of the trajectory des Balls is to be performed (e.g., a football area, a stadium, a lawn area, a beach, a square, or the like). One can therefore do away with an additional device, which must be carried and set up, and the determination of the property of the trajectory of the ball may be performed at virtually any place.

The method steps can, for example, be performed with an app which can simply and cost effectively be purchased via a virtual market place. Alternatively, the mobile computer device may be equipped with the claimed functionality in its delivery status.

The method can use the camera of the mobile computer device to take a sequence of video frames of, for example, a kick of a soccer ball. It is contemplated to use the method with other ball sports such as tennis, golf, table tennis, football, basketball, and the like. Also, instead of a kick, the ball may be batted, for example, as with a tennis ball or thrown, for example, as with a basketball.

The sequence of video frames may be directly taken with the app, which performs the claimed method steps. It is also contemplated that the sequence may be taken with the default video function of the mobile computer device, stored in the memory of the mobile computer device and subsequently provided to an app for analysis, by having the app access the stored sequence.

The determination of first and second picture coordinates in a first and second video frame of the sequence may be performed by means of an edge detection method, which detects color and/or intensity gradients in a video frame or picture, respectively. Other methods, based on artificial neural networks, are contemplated, the picture coordinates may relate to the center of the ball in the video frames. It is also contemplated that the picture coordinates relate, for example, to a corner of a quadrant or rectangle in which the ball just fits (e.g., the edges, which lay on a tangent of the ball in the video frame).

In some embodiments, the difference between the picture coordinates of the ball may be the mathematical difference between the picture coordinates in the first and the second video frame. The picture coordinates may be pixel coordinates in two mutually perpendicular dimensions, for example x- and y-coordinates. The x-coordinate in the first frame may be subtracted from the x-coordinate in the second frame, or vice versa. The y-coordinate in the first frame may be subtracted from the y-coordinate in the second frame, or vice versa. The resulting difference of the x-coordinates and the resulting difference of the y-coordinates may be squared and the results may be added to compute, for example, the speed. The square root may be taken of the sum to obtain (e.g., the absolute value of the moved distance of the ball between the first and second video frame in pixels).

The time difference between the first and second video frames may be determined from the indication of the frame rate of the camera of the mobile computer device. The time difference between two consecutive video frames of the video sequence in seconds can correspond to the reciprocal value of the frame rate expressed in frames per second. The number of frames between the first and second video frames in the sequence of video frames may be considered.

The determined distance between the first and second frames in pixels may be divided by the time difference between the first and second video frames to obtain the speed of the ball in pixels per time unit, for example pixels per second.

The property of the trajectory of the ball may be speed, acceleration, an angle, or a flight distance. The speed may for example be the speed of the ball shortly after the ball is batted or kicked. The acceleration may be acceleration achieved by kicking, throwing or batting the ball. The angle may be the batting, throwing or kicking angle. The flight distance may be the distance between the point where the ball is batted and the point where the ball hits the ground. The mentioned properties of the trajectory of the ball may be interesting, e.g., for hobby and occasional sportsmen, but also for professional athletes and trainers to compare their performances.

The first and second video frames may be consecutive frames in the sequence of video frames. Thus, the property of the trajectory of the ball may be determined from consecutive video frames. For example, the speed of the ball may be determined from frame to frame to obtain a sequence of speeds.

The steps (b), (c) and (d) may be performed for a plurality of video frames of the sequence of video frames. Thus, a sequence of the property of the trajectory of the ball or an average value may be determined from the sequence of consecutive video frames.

The property of the trajectory of the ball may be computed based on the method of least squares. This method allows for computing a very exact average value. For example, the speed may be determined from consecutive video frames and an estimate of the mean speed may be obtained by means of the method of least squares. Alternatively, the speed could be determined by fitting a line to the x-coordinates and y-coordinates, respectively, in consecutive video frames as a function of time using the method of least squares. Subsequently, the absolute value of the speed may be determined by taking the square root of the sum of the squared slopes of both lines.

The method can use a reference quantity to compute the desired property of the trajectory of the ball. The reference quantity can relate dimensions determined from the first and second video frames to the actual dimensions. For example, the reference quantity may express which difference in reality corresponds to the moved distance of the ball between the first and second video frame. The reference quantity can have the unit of meter per pixel.

In some embodiments, the reference quantity may be based on a form and/or dimension of the ball in a picture taken with the camera of the mobile computer device. The form used as the reference quantity may be the curvature of the ball. The dimension of the ball may be the diameter of the ball. Other quantities are also contemplated. The reference quantity may be computed from a dimension, for example, the diameter, of the ball in pixels as determined from the picture and a known dimension, for example, the known diameter of the ball. The reference quantity may be a ratio of a dimension determined from the picture and the actual dimension.

The picture taken with the camera may be a video frame of the sequence of video frames. Alternatively, it may be a photo created by the photo function of the camera. The picture may be of the ball when it is not moving, which may be before the ball is kicked, batted or thrown.

The described steps for computing a property of the trajectory of the ball may also be performed in another order. For example, a pixel may be translated into meter or centimeter by means of the reference quantity, before the property of the trajectory may be computed.

In certain embodiments, of the method the reference quantity may be computed based on a known form and/or dimension of the ball. For example, a dimension of the ball in a picture may be related to an actual dimension of the ball. Thereby, the property of the trajectory (e.g., the speed) in reality may be computed, for example, in meter per second or kilometer per hour.

The know form and/or dimension may be passed to the method as an input value. For example, the actual form and/or dimension of the ball may be stored in an app performing the claimed method steps. Alternatively, the user may input the form and/or dimension of the ball. It is also contemplated that the user selects from a list of sports and each sport may be assigned the form and/or dimension of the ball corresponding to the sport. Correspondingly, the user may be presented with a selection of different balls and/or its corresponding diameters from which the user may select. In an alternative embodiment of the invention the form and/or dimension of the ball corresponding to the sport may be stored on a server, e.g., as a list, and may be loaded onto the mobile computer device if needed.

In some embodiments, the form and/or dimension of the ball may be a diameter, radius, circumference, an arc length, a distance or a curvature of the ball itself or a pattern thereon. For example, the circumference of the ball may be determined from the picture and may be related to the actual circumference of the ball. Alternatively, a pattern of known form and/or dimension on the ball may be used for determining the reference quantity.

In some embodiments, the picture taken with the camera may be a video frame of the sequence of video frames. This accelerates the method, because it may not be required to take a separate photo with the camera for determining the reference quantity, but this may be taken from the sequence of video frames.

Alternatively, the picture taken with the camera may be a photo taken with the camera. In mobile computer device cameras, individual photos usually have a higher resolution than video frames from video sequences. Therefore, in some embodiments, the reference quantity may be determined more precisely with a photo than with a video frame.

In some embodiments, the method further comprises the step of: determining a partial sequence of video frames in the sequence of video frames which show the ball in motion and selecting at least the second video frame from the partial sequence. Therefore, the ball may be in motion at least in the second picture and its speed may be determined from the difference of its picture coordinates from the first video frame. The ball may also be in motion in the first picture. Alternatively, the ball may be still in the first video frame; this may be the chronologically last video frame of the sequence in which the ball is still.

In some embodiments, the property of the trajectory of the ball may be determined from more than one video frame of the partial sequence. In this manner, the property of the trajectory of the ball may be determined as an average value of several video frames, which can increase measuring accuracy. The difference between the picture coordinates may be determined in several pictures of the partial sequence with reference to a single earlier first video frame, but it is also contemplated that the difference between the immediately preceding image may be determined.

In some embodiments, the first video frame of the partial sequence may be determined by means of a binary search algorithm. In a binary search algorithm, it may be determined for a video frame from the middle of the sequence whether the ball is in motion. If this is the case, a video frame from the middle of the first half of the sequence may be selected and another determination may be made. If this is not the case, a video frame from the middle of the latter half of the sequence may be selected and another determination may be made. In this manner, the beginning of the partial sequence may be found in a maximum of $\lceil \log_2(n) \rceil$ steps, n being the number of video frames in the sequence and the function rounding $\lceil . \rceil$ up to the next integer. In view of the limited processing power of some mobile computer devices, the method may be accelerated in this way.

In certain embodiments, the method comprises the step of: extrapolating the picture coordinates of the ball in at least one of the video frames of the sequence of video frames. In so doing, the location of the ball in the subsequent video frames may be extrapolated. This estimation may be used for further method steps in order to accelerate the method.

In some embodiments, the method comprises the step of: determining of the first and second picture coordinates of the ball in the first and the second video frame of the sequence via steps (b) and (c) using the extrapolated picture coordinates. For example, the ball may be searched based on extrapolated picture coordinates in the first and the second video frame. In this way, having to search the entire pictures for a ball may be avoided, which can accelerate the method. Searching for a certain object in a picture may be rather CPU-intensive because the entire picture may have to be searched for the contour of the object. Furthermore, the size of the object in the picture may be unknown because this depends on the distance between the camera and the object and other factors. Thus, the search algorithm may have to search the picture for different possible sizes of the object.

The method can further comprise the step of: estimating the number of video frames of the partial sequence based on the extrapolated picture coordinates. In this manner, the initial number of video frames in which the ball may be searched may be limited, which can accelerate the method, especially in view of the limited resources of a mobile computer device.

In certain embodiments, the method further comprises the steps of: obtaining an indication of a user relating to the position of the ball in a video frame of the sequence of video frames and using the indication to determine the position of the ball in the video frame. It may be advantageous for the specification of the user to be taken as a basis for the search for the ball in the video frames so that it may not be necessary for an entire picture to be searched for the ball in each case. Moreover, the ball may be differentiated from other round objects in this way, which objects may be erroneously identified as a ball. The user can tap the place on a touch-sensitive screen of the mobile computer device in which the ball may be shown in the video frame. Alternatively, the user can select the position by means of a cursor shown on the screen.

In some embodiments, a predetermined number of temporal first video frames of the sequence of video frames may not be considered for determining the speed. The chronologically first pictures of a video sequence may be frequently jittery since the user presses a button on the smartphone or a touch-sensitive display of the mobile computer device in order to start recording. This movement may be frequently reflected in the chronologically first video frames of the sequence being jittery. By not considering the chronologically first images, the accuracy of the measurement of the property of the trajectory of the ball on the whole may be increased. For example, the first seven images of the sequence of video frames may not be considered.

In some embodiments, the method further comprises the steps of: determining an angle of flight of the ball; and computing a flight distance of the ball based on a computed angle of flight and a computed speed of the ball. Accordingly, it can also be displayed to the user, in addition to the speed, how far the ball should fly. Flight distance may be determined from the common ballistic trajectory of an object. The air resistance of the ball can also be considered in the flight distance computation.

In some embodiments, the method comprises the step: determining an initial acceleration of the ball. This quantity may be a measure of the force exercised by the player when kicking, batting or throwing the ball. For example, the initial acceleration may be the acceleration as experienced by a soccer ball when kicked by a player. The initial acceleration may be used for a comparison among players in a competition.

In some embodiments, the sequence of video frames may be taken essentially perpendicular to a trajectory of the ball. The trajectory may be essentially at an angle of 90° to the recording direction of the camera of the mobile device, so that the property of the trajectory of the ball (e.g., ball speed) may be computed correctly. For at an angle of 90°, the trajectory of the ball can have the smallest motion component towards the camera or from the camera. For example, the position of the camera can deviate less than 10° from a right angle to the trajectory. In addition, the user may be made aware of the ideal position relative to the ball before the method is carried out.

In certain embodiments, the video frames may be read into a video buffer for processing. A video buffer can enable rapid access to the image data. The video buffer may be established in the internal memory of the mobile computer device. The internal memory may be accessed rapidly through the processor of the mobile computer device. Alternatively, it may be a dedicated video buffer in a video processor or graphic acceleration chip of the mobile computer device.

In some embodiments, the processed video frames can also be stored in a video buffer as writing access to a video buffer can also be very fast.

In some embodiments, the method may be provided with a fixed number of predetermined video buffers. The central memory or the dedicated video memory of the mobile computer device may be spared and the method may be accelerated, since it may not be necessary for a further part of the memory to be reserved for each video frame to be newly processed. Four video buffers may be available to the method.

In certain embodiments, the method comprises the step of: superimposing a computed trajectory of the ball on at least one video frame of the sequence of video frames and/or on a photo taken with the camera. In this manner, the trajectory may be displayed to the user. This may be a still image, for example, which shows an image during the kick and the trajectory of the ball. This still image may be generated after computing the trajectory.

The method can further comprises the step of: sending with the mobile computer device at least the determined property of the trajectory of the ball to a server. The sending may occur wirelessly, e.g., by means of a transmitter or transceiver using radio technologies such as Bluetooth, BTLE (Bluetooth, Low Energy), WLAN, GSM, GSM, UMTS, LTE, NFC or other wireless radio technologies. The sending may alternatively occur by wire, e.g., by means of a USB cable, micro USB cable, Firewire, Lightning cable, phone jack, or the like. The sending may occur in a manual way, for example by having the user press a key on the device or its screen. Alternatively, the sending can occur automatically (e.g., after each shot, hit or throw or to predetermined points in time such as each hour or in the evening).

The server may be the server of a social network, which allows sharing the property of the trajectory of the ball, for example its speed, the initial angle or the flight distance for the purpose of comparing with other players. Known social networks include, e.g., Facebook® and Twitter®. The server may also be a "Cloud" database (e.g., "iCloud" of Apple or "Dropbox"). A desktop PC or a laptop may also be used as a server for storing the sent data. The data may for example be transferred from the mobile computer device to a desktop PC or a laptop by means of the software "iTunes" of Apple.

A picture of the player when kicking, striking or throwing can also be uploaded to the server. The computed property of the trajectory of the ball (e.g., its speed) may be depicted on the picture. Additionally, further data such as the shooting angle, the flight distance, a video of the shot, a hit or a throw, picture sequences or graphics and data of the player (e.g., the player's name) may be sent to the server.

In some embodiments, a ranking of players may be stored on the server. The ranking could for example comprise the names or aliases of players and their best performances. The best performance could be, for example, the highest achieved ball speed, the highest acceleration or the longest shot, hit or throw. The ranking could be made from the results of all registered users or relate to a group of users (e.g., a circle of friends only). The ranking could comprise the date on which the best performance was achieved in addition to the best performances and the names of the users. In addition to the name, a picture of the user may be shown.

The ranking of the player may be specific to the sport. For example, on a ranking specific for a sport, only properties of the trajectories may be shown, which have been determined when playing soccer. In addition or alternatively, the ranking may be specific for countries. For example, on a ranking specific for countries, only properties of the trajectories may be shown, which have been achieved by German players. Further, in addition or alternatively, the ranking may be specific as to age. For example, on a ranking specific as to age only, the properties of trajectories may be shown which have been determined players between 20 and 25 years old.

The ranking could be viewable by all players. Alternatively, the ranking could be viewable by players, which have signed in on a server.

According to a further aspect of the present invention, a mobile computer device comprises: (a) a camera, which may be configured for taking a sequence of video frames of a ball; (b) a processor, which may be configured for: (1)

determining a first picture coordinate of the ball in a first video frame of the sequence; (2) determining a second picture coordinate of the ball in a second video frame of the sequence; (3) computing a property of the trajectory of the ball based on a difference of the first and second picture coordinates, a time difference between the first and second video picture and a reference quantity, which may be determined based on a form and/or dimension of the ball in a picture taken with the camera.

A further aspect of the present invention refers to a mobile computer device which may be configured to carry out a method described herein, according to the invention.

A still further aspect of the present invention refers to a computer program which comprises instructions which can cause a processor and a camera of a mobile computer device to carry out a method described herein, according to the invention.

In certain embodiments, the computer program may be an app for a mobile computer device.

BRIEF DESCRIPTION OF THE DRAWINGS

Embodiments of the method according to the invention and the mobile computer device according to the invention are described in the following detailed description, with reference to the following drawings:

FIG. 2: A flow chart of the method, according to certain embodiments of the invention.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways and used in conjunction with other existing or future technologies and may include different elements or steps. This description should not be interpreted as implying any particular order or arrangement among or between various steps or elements except when the order of individual steps or arrangement of elements is explicitly described.

Hereinafter, embodiments of the present invention are described with reference to a method for measuring a property of the trajectory of a ball with a mobile computer device.

Figure 1:
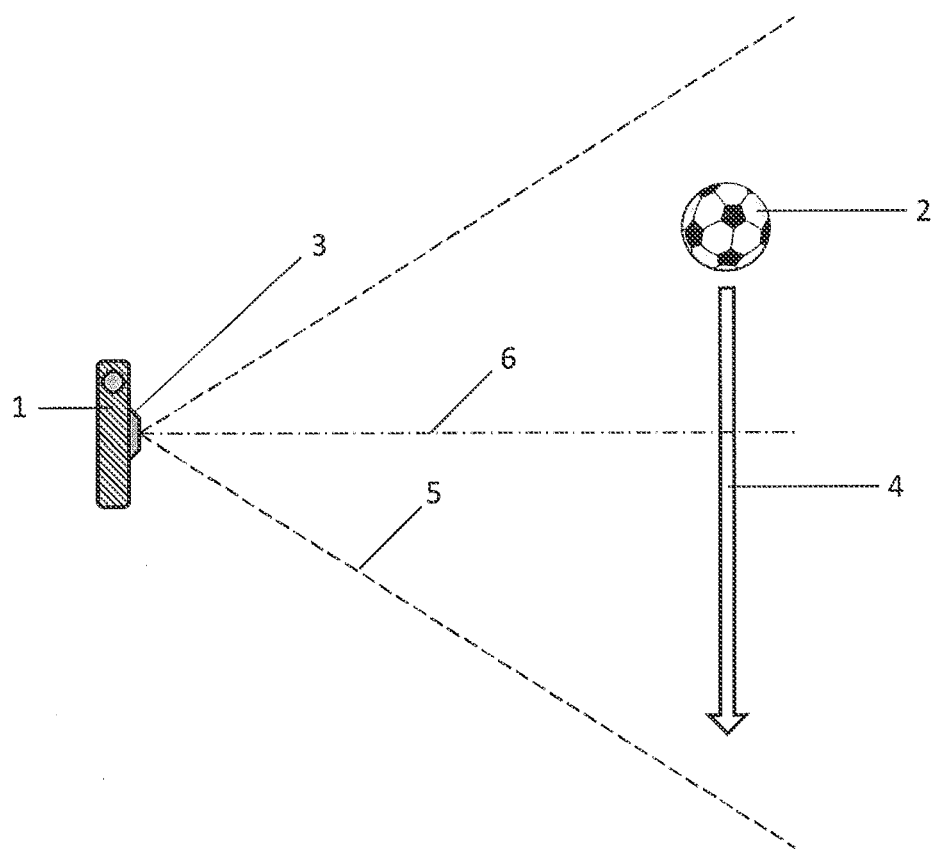
FIG. 1: A schematic top view of a relative positioning of the mobile computer device and the ball for carrying out the method, according to certain embodiments of the invention.

A schematic top view of a relative positioning of the mobile computer device 1 and the ball 2 that may be used for carrying out the method according to the invention is shown in FIG. 1. The mobile computer device 1 may be, for example, a smartphone, a tablet computer or a mobile media player. In the positioning shown in FIG. 1, the ball 2 and a part of its expected trajectory 4 may be in the field of vision 5 of a camera 3 of the mobile computer device 1. In order to be able to compute the property of the trajectory 4 of the ball 2 (e.g., its speed), by means of the method according to the invention, the central axis 6 of the field of vision 5 of the camera may be essentially perpendicular to the expected trajectory 4 of the ball 2. However, deviations from a right angle may be tolerable. Thus, the method according to the invention can still provide sufficiently precise measurement values in case of a deviation from the right angle of 10°, that is, between 80° and 100°.

The mobile computer device 1 and the ball 2, respectively, may be positioned with respect to one another such that the greatest possible share of the trajectory 4 of the ball 2 may be within the field of vision 5 of the camera 3. This can ensure that at least two video frames of the video sequence recorded with the camera 3 show the ball 2 in motion for the evaluation and computation of the property of the trajectory 4 of the ball 2 (e.g., its speed). As shown in FIG. 1, this may be achieved by the ball 2 being positioned at a certain distance from the central axis 6 of the field of vision 5 of the camera 3. In other words, the ball 2 may be positioned or the camera may be arranged such that ball 2 is positioned at the edge of the field of vision 5 captured by the camera. For example, the distance between camera 3 and ball 2 may be, may be three meters. The method may, however, also be performed with different distances.

The process of the method according to the invention is shown in FIG. 2. At block 21, a sequence of video frames showing the ball 2 may be recorded with a camera 3 of the mobile computer device 1. In general, the cameras of mobile computer devices may be suitable for recording and storing a sequence of video frames in the form of video films.

Figure 3:
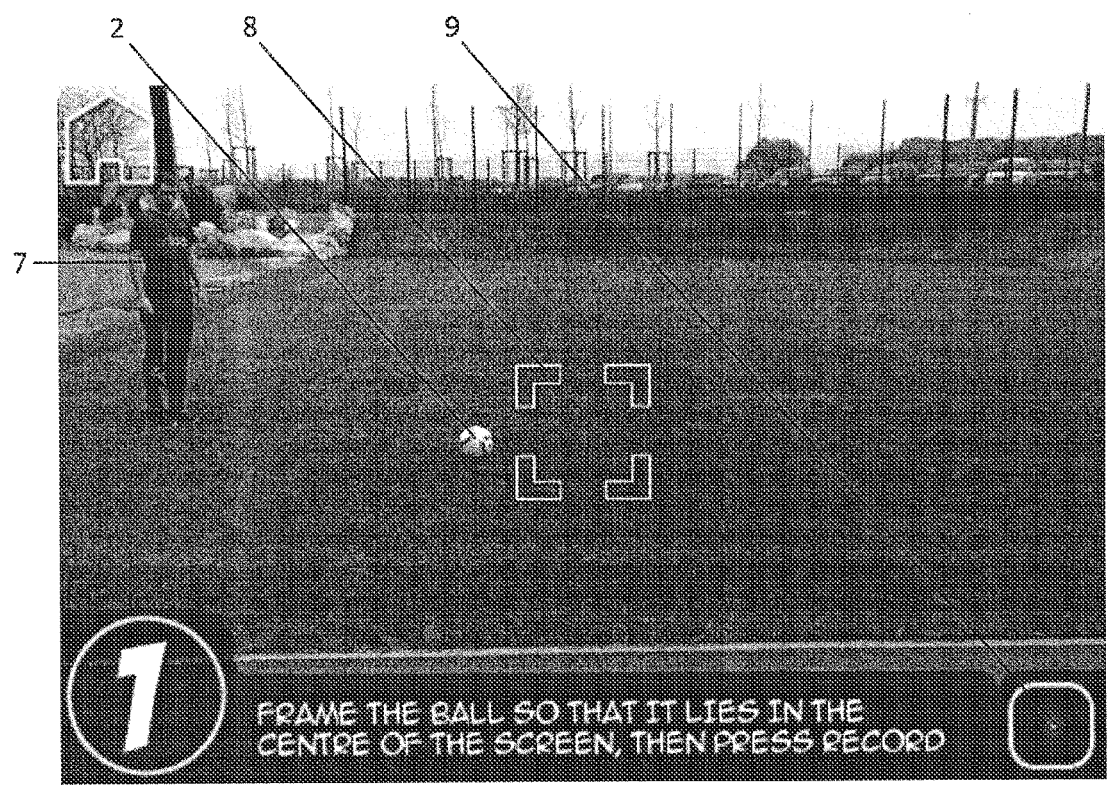
FIG. 3: An exemplary screen view when recording a sequence of video frames, according to certain embodiments of the invention.

FIG. 3 shows an example of a screen view as presented to the user of the mobile computer device 1 while the sequence of video frames may be recorded. The ball 2 may be shifted towards the left edge of the field of vision of the camera here, as described with regard to FIG. 1 above. A displayed marking 8 can facilitate finding an ideal distance from the ball 2 for the user of the mobile computer device 1. For example, the camera may be adjusted such that be larger than the marking 8 in the screen view. Otherwise, the camera 3 of the mobile computer device 1 may be too close to the ball 2, so that, in case of a hard shot, the ball may fly out of the field of vision 5 of the camera 3 so fast that no video frame of the recorded sequence shows the ball 2 in motion and the property of the trajectory 4 of the ball 2 (e.g., its speed) cannot be computed precisely.

A soccer player 7 who can subsequently shoot or kick the ball 2 is also shown in FIG. 3. However, the present invention may not be limited to football, but rather can also be used in a plurality of ball games such as tennis, golf, basketball, table tennis, football, and the like.

A record button 9 on the touch-sensitive screen of the mobile computer device 1 is shown in FIG. 3. The user of the mobile computer device 1 can press this record button to start recording a sequence of video frames with the camera 3 of the mobile computer device 1. After pressing the record button 9, the football player 7 may shoot the ball 2 (e.g., in a direction perpendicular to as possible to the central axis 6 of the field of vision 5 of the camera 3, as described with reference to FIG. 1 above). Once the ball 2 has left the field of vision 5 of the camera 3, the user of the mobile computer device 1 may press the record button 9 again in order to terminate the recording of a sequence of video frames.

Alternatively, the recording may be started by pressing the record button 9 and may automatically be stopped after a predefined time (e.g., 5 seconds) or after the mobile computer device 1 detects that the ball 2 was shot and left the field of view of the camera.

In some embodiments, the user may press the record button 9, position the mobile computer device 1 such that the camera 3 points to the ball 2 and then go to the ball and make a predefined sound (e.g., a whistle sound, clapping, shouting, or the like) to start the recording. After the user shoots the ball 2 and can again makes a predefined sound (e.g., a whistle sound, clapping, shouting, or the like) to stop the recording.

In some embodiments, the user may press the record button 9, position the mobile computer device 1 such that the camera 3 points to the ball 2 and go to the ball 2. The mobile computer device 1 may then produce a predefined sound (e.g., a whistle sound or an automatic message) by means of a speaker of the mobile computer device 1 essentially at the same time the recording starts. Subsequently, the user may shoot the ball 2. Optionally, the mobile computer device 1 may produce a predefined sound (e.g., a whistle sound or an automatic message) essentially at the same time the recording stops. The mobile computer device 1 may stop the recording when it is determined that the ball 2 has left the field of vision 5 covered by the camera 3.

During the entire recording, the user may hold the mobile computer device 1 still (e.g., the user may not follow the flying or rolling ball 2 with the camera 3). It may be important that the mobile computer device 1 be held still during the entire recording, as the computing of the property of the trajectory 4 of the ball 2 may otherwise be impaired. In the beginning of the recording, there may be a corresponding instruction shown to the user.

At block 22, the picture coordinates of the ball 2 may be determined in a first video frame of the sequence, as shown in FIG. 2. As such, the ball 2 may not be recognized in the first video frame. This may be carried out with known pattern-recognition methods such as edge-detection methods or, e.g., an artificial neural network.

Once the ball 2 has been recognized in the first video frame, its picture coordinates may be determined. These picture coordinates can refer to the geometrical center of the ball 2 in the first video frame. The center may be determined by means of a fit (e.g., based on the method of the smallest squares) to the pixels of the edge of the ball 2 which may be determined by means of an edge-detection method. Other methods are also contemplated. Thus, for example, the smallest square or rectangle into which the ball 2 in the video frame fits can also be searched. As such, the edges of this square or rectangle may be located on the tangents of the ball 2 in the video frame. The picture coordinates can then refer to a corner of the square or rectangle.

The picture coordinates may, for example, specify the coordinates of the center of the ball 2 in the horizontal direction (x coordinate) and the vertical direction (y coordinate) in pixels, computed from the left upper corner of the video frame.

Figure 4:
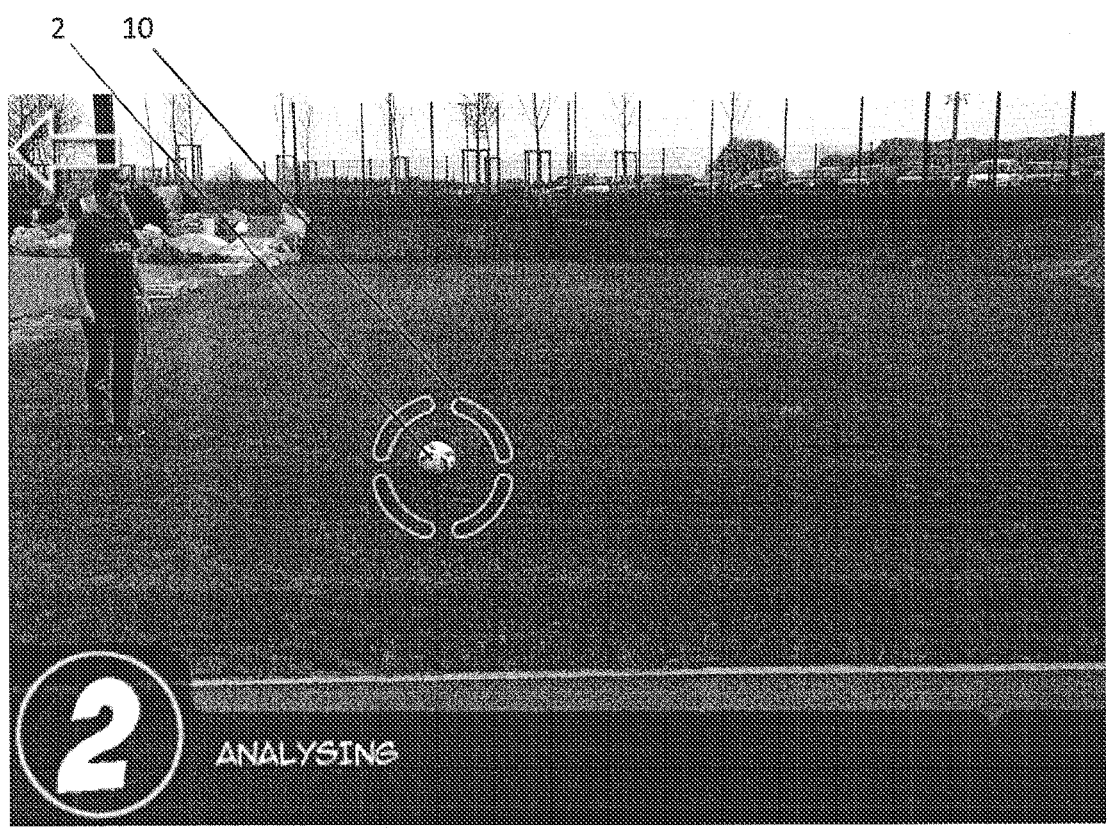
FIG. 4: An example of a screen view when the ball position may be specified by the user, according to certain embodiments of the invention.

In order to facilitate finding the ball 2 in the video frame, the user may be requested to indicate or tap on the ball in at least one video frame of the sequence. FIG. 4 illustrates an example of a screen view when the user has tapped on the ball 2, thereby specifying its approximate picture coordinates. Subsequently, the ball 2 may be searched in the video frame based on the picture coordinates specified by the user. This can allow the ball 2 to be found more rapidly, since it may not be necessary for the entire video frame to be searched for the ball 2. Moreover, this can prevent other round objects in the video frame from being wrongly recognized as the ball. After the ball 2 has been found based on the picture coordinates specified by the user, optical feedback may be provided to the user. In the example of FIG. 4, this is roundish marking 10 surrounding the ball 2.

Figure 5:
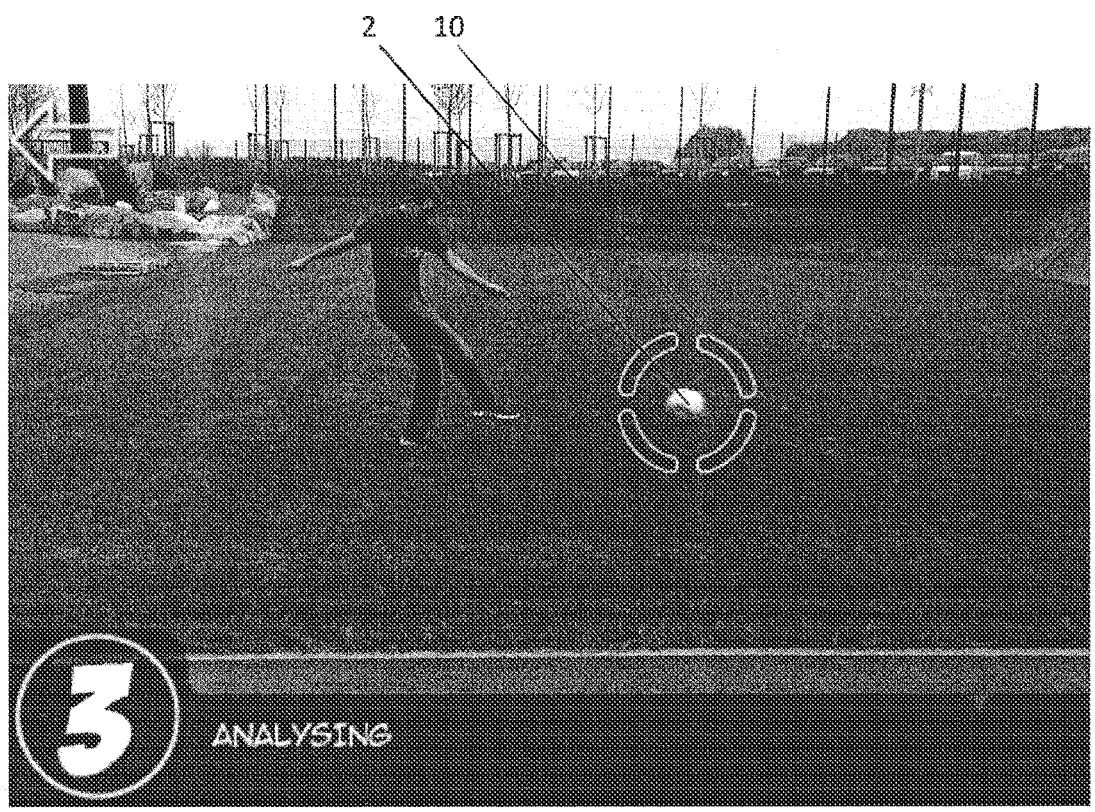
FIG. 5: A further example of a screen view when the ball position may be specified by the user, according to certain embodiments of the invention.

The specification by the user regarding the picture coordinates of the ball 2 does not necessarily have to be made with regard to the video frame, which may be used for computing the speed of the ball 2. When the user specifies the picture coordinates of the ball 2, the ball 2 may be still, as shown in FIG. 4, but it may also be in motion, as shown in FIG. 5.

At a block 23, the picture coordinates of the ball 2 may be determined in a second video frame of the sequence, as shown in FIG. 2. With regard to finding the ball 2 in the second video frame and determining its picture coordinates, the discussion concerning the methods and variations thereof related to block 22 above can also apply to block 23.

At block 23, the ball 2 may be detected in the second video frame. This may be done with known pattern recognition methods such as an edge detection method or an artificial neural network.

Once the ball 2 has been recognized in the second video frame, its picture coordinates may be determined. These picture coordinates can refer to the geometrical center of the ball 2 in the second video frame. The center may be determined by means of a fit (e.g., based on the method of the smallest squares) to the pixels of the edge of the ball 2 which may be determined by means of an edge-detection method. Other methods also contemplated. Thus, for example, the smallest square or rectangle into which the ball 2 in the video frame fits can also be searched. As such, the edges of this square or rectangle may be located on the tangents of the ball 2 in the video frame. The picture coordinates can then refer to a corner of the square or rectangle.

The picture coordinates may, for example, specify the coordinates of the center of the ball 2 in the horizontal direction (x coordinate) and the vertical direction (y coordinate) in pixels, computed from the left upper corner of the second video frame.

In order to facilitate finding the ball 2 also in the second video frame, the user may be requested to indicate or tap on the ball 2 in at least one video frame of the sequence as has been explained in the context of FIG. 4. FIG. 5 illustrates an example of a screen view when the user has tapped on the ball 2 being in motion, thereby indicating its approximate coordinates. Subsequently, the ball 2 may be searched in the second video frame starting from the picture coordinates as indicated by the user.

The ball 2 may be in motion (e.g., the ball may have been kicked, hit or thrown already) in at least of the two video frames so that a property of the trajectory 4 of the ball 2 may be computed at block 24. For example, the first video frame may be the last video frame of the sequence in which the ball is still lying still, whereas the immediately subsequent second video frame shows the ball 2 in motion. Alternatively, the first video frame can also show the ball 2 in motion. For example, the first and the second picture may be selected from a partial sequence of video frames, which show the ball in motion, such as in flight.

The chronologically first video frame of such a partial sequence may be determined with a binary search algorithm. A binary search algorithm may be used to determine whether the ball 2 is in motion for a video frame from the middle of the sequence. If this is the case, a video frame from the middle of the first half of the sequence is selected and another determination made. If this is not the case, a video frame from the middle of the latter half of the sequence may be selected and another determination may be made. In this manner, the beginning of the partial sequence may be found in a maximum of $\lceil \log_2(n) \rceil$ steps, n being the number of video frames in the sequence and the function rounding $\lceil . \rceil$ up to the next integer.

At block 24 of the method according to the invention, a property of the trajectory 4 of the ball 2 may be computed based a difference between the first and second picture coordinates, a time difference between the first and second video picture and a reference quantity, which may be determined based on a form and/or dimension of the ball 2 in a picture taken with the camera 3.

For example, the speed of the ball 2 may be computed using the difference between the picture coordinates as described below.

The difference between the picture coordinates of the ball 2 in a first and a second video frame may be computed as the difference between the x and y coordinates of the two video frames. If the picture coordinate are $(x_1, y_1)$ in the first video frame and $(x_2, y_2)$ in the second video frame, for example, the difference between the picture coordinates may be: $(x_2-x_1, y_2-y_1)$. In order to obtain the absolute sum of the speed of the ball, the distance s traveled between the first and the second video frame may be computed from this vectorial difference in the known manner: $s=\sqrt{(x_2-x_1)^2+(y_2-y_1)^2}$.

In addition to the traveled distance s, the time difference t between the first and the second video frames can also be taken into account for the speed to be calculated. This time difference may be determined from the picture repetition frequency provided by the camera 3 of the mobile computer device 1. The time difference between two subsequent video frames follows from the reciprocal of this picture repetition frequency. If the camera 3 provides 30 pictures per second, for example, the difference between two subsequent pictures amounts to 1/30 seconds, that is, approximately 33 milliseconds. If the first and second video frames are not immediately subsequent, this has to be taken into consideration accordingly. For example, if there are another two video frames between the first and the second video frames and the picture repetition frequency is 30 pictures per second, the difference between the first and the second video frames amounts to 0.1 seconds, that is, 100 milliseconds.

The speed could now be computed in the known manner as the quotient of distance and time, that is, s/t. However, the distance s computed using the difference between the picture coordinates of the ball 2 refers to the unit used for specifying the picture coordinates, which may be pixels. However, a specification of the speed in reality and not in the sequence of video frames may be desired. Therefore, when calculating the speed, a reference quantity may be used, which places the traveled distance or speed in the sequence in relation to the actual traveled distance or the speed in reality, respectively.

The reference quantity can specify, for example, that a pixel traveled by the ball 2 corresponds to one centimeter in reality. The reference quantity can also specify a relation between the speeds and state, for example, that one pixel per second corresponds to one-hundredth of a meter per second.

The reference quantity may be determined based on a form and/or dimension of the ball in a picture taken with the camera 3. The diameter or circumference of the ball 2 may be determined in a video frame of the sequence. This video frame may be, for example, a video frame as shown in FIG. 4 and in which the ball is still, so that its circumference or diameter may be determined. However, it does not have to be a picture from the video sequence. For example, a photo may be taken with the camera's 3 photo function, which may be used for determining the diameter or circumference of the ball 2. Instead of the circumference and the diameter, it can also be possible to determine the edge length of a square or rectangle in which the ball 2 fits.

In a specific example, the diameter of the ball 2 may be determined based on a picture with 50 pixels taken with the camera 3. Since a football usually has a known diameter of 22 cm, a reference size of 50/0.22 ($\cong$227.27) pixels per meter follows. The reference quantity may also be specified as a reciprocal, that is, 0.22/50 ($\cong$0.0044) meters per pixel. The reference quantity can put a length in a video frame in relation to a length in reality and that a reference quantity may be determined for the shape and/or size of the ball 2.

In the above example, the reference quantity may be determined based on the known diameter of the ball 2. The use of other known quantities is also contemplated (e.g., the circumference of the length of an elliptic semi-axis of an American football). It is also possible to determine the reference quantity by means of the shape of the ball (e.g., by means of the curvature of a ball's surface). The shape and/or size of the ball 2 can also be the form and/or size of a pattern applied to the ball 2.

The known diameter of the ball 2 (22 cm in the above example) may be stored in the mobile computer device 1. The user could for example select a sort of ball sport for which the user wants to obtain properties of the trajectory 4 of the ball (e.g., the speed). The user may be presented with a selection of different balls and/or the corresponding diameters from which the user may choose. The diameter (and further data as the case may be) of the different balls could be stored in the mobile computer device 1. Alternatively, the diameter and further data may be stored on a server and may be loaded in the mobile computer device 1 when needed. In this example, the distance traveled by the ball 2 between the first and the second video frames may amount to 100 pixels, for example. According to the above referenced quantity, 100 pixels correspond to a distance of 100·0.0044=0.44 meters traveled. If the picture repetition frequency amounts to 30 pictures per second, for example, and if the first and the second video frames are directly subsequent to each other, the time difference between the two video frames may amounts to 1/30 ($\cong$0.033) seconds. The speed of the ball 2 in reality may be therefore calculated as 0.44/(1/30) =30·0.44=13.2 meters per second. This corresponds to a speed of the ball 2 of 47.52 kilometers per hour.

Figure 6:
FIG. 6: An example of a screen view when the computed speed, flight distance and shoot angle may be displayed, according to certain embodiments of the invention.

It is shown by way of example in FIG. 6 how the result of the method according to the invention may be displayed to the user. In this example, a speed of 110 kilometers per hour ("KPH") results which may be shown to the user (e.g., see reference sign 11). This corresponds to approximately 68.4 miles per hour. In FIG. 6, a computed trajectory 12 of the ball 2 may be furthermore superimposed on the shown video frame from the sequence of video frames. This computed trajectory 12 may be computed from the sequence of video frames by the picture coordinates of the ball 2 being determined in each video frame, which shows the ball 2 in motion and a trajectory being interpolated from that. Alternatively, the trajectory 12 can also be computed from a few video frames and extrapolated from the computed speed and/or a determined angle of flight. The trajectory 12 may furthermore be superimposed on a photo taken with camera 3 instead of on a video frame.

In addition, in the example of FIG. 6 the determined flight distance 13 of 29 meters and the determined shot angle 14 of four degrees is shown to the user.

In the exemplary screen views of FIGS. 3 to 6, symbols are shown in the top left corner which the user may tap or click for certain functions. In the top left corner of FIG. 3 and in the bottom right corner of FIG. 6 a symbol in the shape of a house is shown. By tapping or clicking this symbol, the user may switch back to a main menu. In FIGS. 4 and 5, a symbol in the shape of a horizontal arrow is shown in the top left corner. By tapping or clicking this symbol, the user can return to a previous method block. In FIG. 6, a symbol in the shape of a circular arrow is shown in the top left corner. By tapping or clicking this symbol, the user may repeat a recording with the camera 3 of the mobile computer device 1, for example, if the previous recording was not good. Adjacent to this symbol a triangular symbol may be shown. By tapping or clicking this symbol, the user may play back a previously recorded video.

The symbols shown in FIGS. 3 to 6 may be shown at different locations of the screen and may be otherwise shaped. It is further contemplated that text instead of symbols is shown.

The calculated speed of the ball 2 or other properties of the trajectory 4 may be transmitted from the mobile computer device 1 to a server on the Internet. For example, the speed may be shared with other users in a social network such as Twitter® or Facebook®. Rankings of players by their respective best speeds, highest flight distances, or the like may be kept and published on the server. It is also contemplated that the speed, flight distance or the like may be stored in a personal training history of each player in order to document improvements of performance. It is also contemplated that at least the determined property of the trajectory 4 of the ball 2 or several properties of the trajectory 4 may be stored on a team site, app site or website.

Multiplayer games may be performed with the method according to the invention, where several players compete against each other. Such a game may be performed with a single mobile computer device 1. To this end, an app may be, for example, started on the mobile computer device 1 and a game with, e.g., three players selected. Each player then performs the method according to the invention and plays against each other player (e.g., one player can compare his/her results directly with at least one other player). A player loses and may be required to quit the game if the user has a lower performance (e.g., a lower speed or a lower flight distance than the other player against which the user competes). The player who stays in the game until the end (e.g., the player who has won all direct comparisons) wins the game. Alternatively, the players may not compete directly against each other, but rather each player plays, for example, three rounds, the results of which may be added. The player with the highest sum (e.g., flight distances or speeds) wins.

A multiplayer game may also be performed online. In such a scenario, players directly compete via the Internet (e.g., the players may be spatially separated). The players may use an app which may be connected with the Internet, a social internet site (e.g., "Facebook") or a special web page. Each player may then enter a game ("Battle") online and the achieved results may be compared online.

The players may also be temporally separated in addition or alternatively (e.g., each player may play at different times). For example, a multiplayer game could be started at a certain point in time and may run a defined period of time. At the end of the period, a winner may be determined. Thus, players have the opportunity to improve their results by several trials to try to win the game.

The probable range of the kick (e.g., the place where the ball 2 hits the floor) may be computed using the computed speed and angle of flight determined from the video frames of the sequence. For this purpose, known ballistic equations may be used which take the air resistance of the ball 2 into consideration or refrain from doing so for the benefit of simpler computation. When the air resistance is neglected, a range R of $$R = \frac{v^2}{g}\sin(2\beta)$$

results, with v being the computed speed of the ball 2, g being gravitational acceleration (approximately 9.81 m/s², depending on the location on earth) and β being the angle of flight. In case of smaller speeds that usually occur with ball sports, this equation constitutes an adequate approximation of the range of the kick.

The method may be optimized for being carried out on a mobile computer device 1 by various measures. For example, one such measure, may be extrapolate the picture coordinates of the ball 2 in at least one of the video frames of the sequence of video frames. For example, the position of the ball 2 may be extrapolated based on the last video frame, which shows the ball at rest, and at least one subsequent video frame in which the ball may be in motion. Based on the extrapolated picture coordinates, it may be possible to determine the actual position of the ball. As such, the entire video frame may not have to be searched for the ball 2, thereby saving computing time. Moreover, in this manner it can simply be estimated when the ball will leave the edge of the screen and as of which video frame of the sequence the ball will no longer be visible. It may no longer be necessary to search for the ball in these pictures at all then.

The picture coordinates may be extrapolated by the picture coordinate of the ball 2 being determined in two different (e.g., directly subsequent pictures), the picture coordinates being estimated from the difference between the picture coordinates (e.g., how far the ball 2 has moved in each subsequent video frame).

Another measure which can increase the precision of the computed property (e.g., speed) of the trajectory 4 of the ball 2 is not taking into account the chronologically first video frames of the recorded sequence. It has been found that users of a mobile computer device 1 unwittingly jitter the beginning of the recording when pressing the record button 9.

Thus, the first seven video frames in the sequence may be jittery. To prevent imprecisions (e.g., when determining the reference quantity if it is gathered from a video frame which shows the ball 2 at rest) these chronologically first video frames may not be taken into consideration.

Another possibility to avoid jitter may be to automatically start the recording as described above (e.g., with a delay or by sounds). In addition or alternatively, the user may position the mobile computer device 1 on a rigid base.

Instead of making computations, so called lookup tables may be used. These may contain the function values of a function depending on their argument or arguments. For example, the method described above for computing the flight distance from a ballistic equation may be performed by means of a lookup table in which the flight distance depending on the initial speed and the shoot angle is stored.

The table may be searched for the determined initial speed and the determined shoot angle and the value at the corresponding entry in the table may be determined.

Another possibility for optimizing the method for being carried out on a mobile computer device 1 may be reading the video frames to be processed into a video buffer. The memory section in the mobile computer device's 1 internal memory may be reserved as the video buffer and for the video frames to be processed by reading them into this video buffer and processing sequentially. After one video frame has been processed, the next video frame may be read in, which can cause the previous video frame to be overwritten. Processing may include searching the ball 2 in the video frame and determining the reference quantity gathered from this. If processing the video frame (e.g., for edge recognition) is required again in the subsequent step, the processed video frame may be stored in a second video buffer.

Instead of an area in the internal memory, it can also be possible to use a video buffer in a dedicated component (e.g., in a video processor or a graphics acceleration chip). A fixed amount of video buffers (e.g., four) may be allocated to the method for processing the video frames in order to limit the memory required by the method, which may be limited on a mobile computer device.

For the determination of object parameters (e.g., edge or ball parameters) the so called Hough transformation may be used, which transforms a picture into a so called dual space which may be the space where all possible parameter values of the object may be detected. For edge detection, the dual space may be two-dimensional. The first dimension may be generally represented by the distance of the edge, which idealized by a line, to the origin. The second dimension may be represented by the angle of the line with respect to the x-axis. Through the Hough transformation of the original picture into the dual space, accumulation points corresponding to the parameters of the lines or edges in the original picture may be identified. By finding the accumulation points in the dual space, the parameters of the lines or edges in the original picture may be determined.

The Hough transformation may be preceded by a so called edge detection (e.g., by means of a convolution operation like a Canny or Sobel filter) which emphasizes the edges in a picture. The Hough transformation can then deliver the parameters of these emphasized edges. The method according to the invention may be implemented directly in the hardware of a mobile computer device 1. The method may also be implemented by a computer program which comprises instructions which cause a processor of the mobile computer device 1 to carry out the method according to the invention described herein when the instructions are realized on the processor. The computer program may be firmly integrated in the operating system of the mobile computer device 1 or it may be subsequently installable by the user (e.g., when the computer program) is transmitted to the mobile computer device 1 via a USB cable, wireless via WLAN or via a mobile-radio connection). The computer program may also be an app which is offered on corresponding market places on the Internet (e.g., "iTunes"® by Apple and "Google Play"® by Google).

In the following, further examples are described to facilitate the understanding of the invention:

1. Method for determining a property of a trajectory of a ball with a mobile computer device, comprising the steps:
   (a) capturing a sequence of video frames of the ball with a camera of the mobile computer device;
   (b) determining a first picture coordinate of the ball in a first video frame of the sequence;
   (c) determining a second picture coordinate of the ball in a second video frame of the sequence;
   (d) computing a property of the trajectory of the ball based on a difference between the first and second picture coordinates, a time difference between the first and second video picture and a reference quantity, which is determined based on the form and/or dimension of the ball in a picture taken with the camera.

2. Method according to example 1, wherein the mobile computer device is a smartphone, tablet computer or mobile media player.

3. Method according to one of the preceding examples, wherein the at least one property of the trajectory of the ball is speed, acceleration, an angle or a flight distance.

4. Method according to one of the preceding examples, wherein the first and second video frames are immediately consecutive video frames of the sequence of video frames.

5. Method according to one of the preceding examples, wherein the steps (b), (c) and (d) are performed for a plurality of video frames of the sequence of video frames.

6. Method according to example 5, wherein the at least one property of the trajectory of the ball is computed based on the method of least squares.

7. Method according to one of the preceding examples, wherein the reference quantity is determined based on a known form and/or dimension of the ball.

8. Method according to one of the preceding examples, wherein the form and/or dimension of the ball is a diameter, radius, circumference, an arc length, a distance or a curvature of the ball itself or a pattern thereon.

9. Method according to one of the preceding examples, wherein the reference quantity is based on the form or the dimension of the ball in a picture taken with the camera of the computer device.

10. Method according to example 9, wherein the picture taken with the camera is a video frame of the sequence of video frames.

11. Method according to example 9, wherein the picture taken with the camera is a photo taken with the camera.

12. Method according to one of the preceding examples, further comprising the step:
    determining a partial sequence of video frames of the sequence of video frames, which show the ball during movement; and
    selecting at least the second video frame from the partial sequence.

13. Method according to example 12, wherein the first video frame of the partial sequence is determined by means of a binary search algorithm.

14. Method according to one of the preceding examples, further comprising the step:
    extrapolating the picture coordinates of the ball in at least one video frame of the sequence of video frames.

15. Method according to example 14, further comprising the step:
    determining the first and second picture coordinates of the ball in the first and the second video frame of the sequence in the steps (b) and (c) based on the extrapolated picture coordinates.

16. Method according to one of examples 12 to 15, further comprising the step:
    estimating the number of video frames of the partial sequence based on the extrapolated picture coordinates.

17. Method according to one of the preceding examples, further comprising the steps:

obtaining an indication of a user relating to the position of the ball in a video frame of the sequence of video frames; and using the indication to determine the position of the ball in the video frame.

18. Method according to one of the preceding examples, wherein a predetermined number of temporal first video frames of the sequence of video frames are not considered for determining the speed.

19. Method according to one of the preceding examples, further comprising the steps:

determining an angle of flight of the ball; and computing a flight distance of the ball based on the angle of flight and a computed speed of the ball.

20. Method according to one of the preceding examples, further comprising the step:

determining an initial acceleration of the ball.

21. Method according to one of the preceding examples, wherein the sequence of video frames is taken essentially perpendicular to a flight path of the ball.

22. Method according to one of the preceding examples, wherein the video frames are read into a video buffer for processing.

23. Method according to one of the preceding examples, wherein processed video frames are stored in a video buffer.

24. Method according to one of the preceding examples, wherein the method is provided with a fixed number of predetermined video buffers for processing the video frames.

25. Method according to one of the preceding examples, further comprising the step:

superimposing a computed flight path of the ball on at least one video frame of the sequence of video frames and/or on a photo taken with the camera.

26. Method according to one of the preceding examples, further comprising the step:

sending with the mobile computer device at least the determined property of the trajectory of the ball to a server.

27. Mobile computer device (1), comprising:

(a) a camera, which is configured for recording a sequence of video frames of a ball;

(b) a processor, which is configured for:

(1) determining a first picture coordinate of the ball in a first video frame of the sequence;

(2) determining a second picture coordinate of the ball in a second video frame of the sequence;

(3) computing a property of the trajectory of the ball based on a difference of the first and second picture coordinates, a time difference between the first and second video picture and a reference quantity, which is determined based on the form and/or dimension of the ball in a picture taken with the camera.

28. Mobile computer device according to example 27, which is further configured to perform a method of one of examples 2 to 26.

29. Computer program comprising instructions which cause a processor and a camera of a mobile computer device to perform a method according one of examples 1 to 26.

30. Computer program according to example 29, wherein the computer program is an app for a mobile computer device.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A method for determining a property of a trajectory of a ball with a mobile computer device, comprising:

capturing a sequence of video frames of the ball with a camera of the mobile computer device;

determining a first picture coordinate of the ball in a first video frame of the sequence;

determining a second picture coordinate of the ball in a second video frame of the sequence; and computing a property of the trajectory of the ball using the first and second picture coordinates, a time difference between the first and second video picture and a reference quantity, wherein the property of the trajectory of the ball is computed using a least squares method.

2. The method set forth in claim 1, wherein the reference quantity is determined using at least one of a form and a dimension of the ball in a picture taken with the camera.

3. The method set forth in claim 2, wherein the picture taken with the camera is a video frame of the sequence of video frames.

4. The method set forth in claim 1, wherein the mobile computer device is a smartphone, tablet computer or a mobile media player.

5. The method set forth in claim 1, further comprising:

obtaining an indication from a user relating to the position of the ball in a video frame of the sequence of video frames; and using the indication to determine the position of the ball in the video frame.

6. The method set forth in claim 1, further comprising:

superimposing a computed flight path of the ball on at least one of a video frame of the sequence of video frames and a photo taken with the camera.

7. The method set forth in claim 1, further comprising:

sending at least the determined property of the trajectory of the ball to a server via the mobile computer device.

8. Mobile computer device, comprising:

a camera that is configured for recording a sequence of video frames of a ball;

a processor coupled to the camera and configured to:

determine a first picture coordinate of the ball in a first video frame of the sequence;

determine a second picture coordinate of the ball in a second video frame of the sequence; and compute a property of the trajectory of the ball using the first and second picture coordinates, a time difference between the first and second video picture and a reference quantity, wherein the property of the trajectory of the ball is computed using a least squares method.

9. The mobile computer device of claim 8, wherein the property of the trajectory of the ball is speed, acceleration, an angle or a flight distance.

10. The mobile computer device of claim 8, wherein the processor is further configured to:

determine a partial sequence of video frames of the sequence of video frames, the partial sequence showing the ball during movement; and select at least the second video frame from the partial sequence.

11. The mobile computer device of claim 10, wherein the first video frame of the partial sequence is determined using a binary search algorithm.

12. The mobile computer device of claim 8, wherein the processor is further configured to:
   determine an angle of flight of the ball; and
   compute a flight distance of the ball using a computed angle of flight and a computed speed of the ball.

13. A computer-program product, tangibly embodied in a non-transitory machine-readable storage medium, including instructions configured to cause a data processing apparatus to:
   capture a sequence of video frames of the ball with a camera of a mobile computer device;
   determine a first picture coordinate of the ball in a first video frame of the sequence;
   determine a second picture coordinate of the ball in a second video frame of the sequence; and
   compute a property of the trajectory of the ball using the first and second picture coordinates, a time difference between the first and second video picture and a reference quantity, wherein the property of the trajectory of the ball is computed using a least squares method.

14. The computer-program product of claim of 13, wherein the computer-program product is an app for the mobile computer device.

15. The computer-program product of claim 13, wherein the reference quantity is determined using at least one of a known form and a known dimension of the ball.

16. The computer-program product of claim 13, wherein the form or the dimension of the ball is a diameter, radius, circumference, an arc length, a distance, a curvature of the ball or a pattern of the ball.

17. The computer-program product of claim 13, further comprising computer-executable instructions causing the data processing apparatus to:
   extrapolate picture coordinates of the ball in at least one video frames of the sequence of video frames.

18. The computer-program product of claim 17, wherein the first and second picture coordinates of the ball in the first and second video frames of the sequence are determined using the extrapolated picture coordinates.

19. The computer-program product of claim 13, further comprising computer-executable instructions causing the data processing apparatus to:
   determine an initial acceleration of the ball.

* * * * *